2,837,881

Patented June 10, 1958

2,837,881

ENCAPSULATED PRODUCT AND METHOD AND APPARATUS FOR MAKING SAME

Lawrence A. Schneider, Fargo, N. Dak.

No Drawing. Application December 13, 1952
Serial No. 325,880

8 Claims. (Cl. 53—21)

This invention relates to encapsulated normally non-fluid compositions; more especially encapsulated normally non-fluid wax-containing compositions, and to processes for making the same, and machine improvements for making the same, and relates to the normally non-fluid filling compositions of such capsules.

Otherwise stated, this invention relates to new products of manufacture, more especially a finished gelatin capsule capable of being ruptured by finger pressure, or dissolved, and containing a substantially water-free gelatin compatible composition that is not fluid at temperatures approximating the melting point of the gelatin forming the capsule. The invention is particularly concerned with new manufactured products providing gelatin capsules capable of being ruptured by finger pressure or dissolved, containing substantially water-free wax or composition of waxes having melting point and flow point (of the wax or composition of waxes) that are higher than the maximum temperature at which the fillings could previously be deposited in gelatin capsules by known procedures. Specifically, the invention concerns a new product of manufacture, the same being a gelatin capsule capable of being ruptured by finger pressure and filled with a semi-solid or solid polish, such as shoe polish, comprising wax or a composition of waxes, the polish being normally non-fluid at temperatures of 38°–40° C.

It is an object of the invention to provide the aforesaid products of manufacture; to provide methods and machine improvements for producing such products of manufacture and to provide specified filling compositions for such capsules.

Other and further objects of the invention are those inherent in the methods herein illustrated, described and claimed.

In its broadest aspects the product aspects of the instant invention comprise a gelatin capsule which can be broken by finger pressure or dissolved, said capsule having a filling substance or composition which is normally solid or semi-solid at a tempertaure up to and even above 38° to 40° C. The filling is normally non-fluid at temperatures of 38° to 40° C. or less, but is capable of softening and flowing at higher temperatures, such as 50° to 60° C. In addition, the filling substance or composition is thixotropic to an extent sufficient to allow it to be made temporarily fluid at a temperature of 38°–40° C. (or lower temperatures) and in addition has a water content not substantially exceeding about 5%. The water content should preferably be less than 1%. Substantially anhydrous fillings are useful.

The filling substance should be compatible with gelatin and should be free from appreciable amounts of gelatin permeable constituents. Thus, broadly, in respect to the matter of compatibility with gelatin, it may be observed that the filling should neither be highly acidic nor highly alkaline; it should be low in halogen salts, should not contain excessive amounts of high pH materials. Salts, such as NaCl and KI tend to cause disintegration of the gelatin capsule but can be tolerated in low percentages, such as 1% to 2% of the fill. Also, by way of illustration, sulfates in general tend to "tan" the gelatin shell and make it insoluble. This is not undesirable in some uses. Glycerine and propylene glycol cause softening and if sufficiently high in concentration, will cause destruction of the gelatin shell. Low molecular weight alcohols, such as ethyl alcohol, can be encapsulated, but evaporate through the shell and are lost, the same being true to a lesser extent of higher molecular weight alcohols, such as isopropyl alcohol. Higher molecular weight alcohols, such as polyethylene glycols and polypropylene glycols of around 400 molecular weight or higher, are satisfactory as are most of the aromatic and straight chain hydrocarbons. The foregoing is illustrative.

Throughout this specification and in the claims the term "gelatin compatible filling" will be understood to mean a filling that according to known commercial tests does not deteriorate or destroy the gelatin shell and does not permeate therethrough to an appreciable extent.

Exemplary gelatin compatible fillings for the gelatin capsules are those waxes, wax compositions, anhydrous gels, hydrocarbons, greases and the like and mixtures thereof having the common characteristic of being thixotropic and which are non-fluid at 38°–40° C. but having a flow point somewhat above this stated range (as from 50° to 60° C. and even higher) and having a water content of 5% or less. Such selected fillings can be encapsulated in gelatin capsules according to the present invention.

Heretofore it has not been possible to operate gelatin capsule forming and filling machines of the R. P. Scherer type if the composition or substance being filled into capsules (hereinafter referred to as the "filling" or "filling composition" or "filling substance"), was not fluid and flowable at about 38°–40° C. The reason for this has been that at temperatures above this range the gelatin itself melts or is at least sufficiently degraded and weakened so that encapsulation is difficult or leaky capsules result, and the product is generally unsatisfactory. As a result gelatin capsules heretofore producible have been filled with oils and the like (such as vitamin content oils), such fillings being fluid at or below that temperature range (38°–40° C.). Many substances and compositions having flow points above this range have, prior to this invention, been precluded from satisfactory encapsulation in gelatin capsules by any known procedure.

By utilizing my invention higher flow-point and melting-point substances and compositions selected as aforesaid, may be encapsulated in gelatin capsules. This invention may be regarded as considerably extending the range of substances and compositions that can be encapsulated successfully.

Encapsulation in accordance with the present invention is accomplished by a technique which involves shaking or mechanical working the selected thixotropic filling composition until it is rendered temporarily fluid, whereupon the filling is encapsulated and upon standing a reversion to non-fluid condition sets up the filling, but by that time the filling is safely within the gelatin capsule. As much shaking or mechanical working as may be required is used to bring about the condition of temporary fluidity and heating or warming during such shaking or working may be utilized to facilitate this step. Thus a gelatin compatible filling, such as a gel or mixture of waxes, which may be stiff and non-fluid at 38°–40° C. may be heated well above 38°–40° C. to soften it and the filling is then simultaneously shaken or stirred in bulk until the mass becomes fluid, the stirring or shaking being then continued as the filling is allowed to cool back down to or below the limiting temperature 38°–40° C. at which the encapsulation in gelatin in R. P. Scherer type machines may be accomplished. The condition of temporary fluidity so induced lasts long enough to allow successful encapsulation.

While the temporary fluid condition of the selected thixotropic gelatin compatible filling material may be induced by "shaking," it can also be brought about most conveniently in industrial production and in the laboratory by the use of mechanical working equipment. Thus, for this purpose a mixer equipped with counter-rotating blades similar to the blades of a Waring Blendor and driven by a sufficiently powerful motor may be used. The filling composition or substance is worked and sheared, as by the aforesaid beating or mixing equipment and becomes plastic and finally temporarily fluid at temperatures of 38°–40° C. and lower. Gentle heating, as by a water bath, may be used during the initial part of the period the filling is being rendered fluid to aid the mixing. When the filling has been thus rendered temporarily fluid, it is then, without undue delay, poured into the vats that are provided in the capsulating machine, and the machine is then without undue delay run, and the filling encapsulated. Machines, such as shown in United States Patents 1,970,396; 2,199,290; 2,152,121; 2,288,327; 2,431,141, may be used. In machines of this type gelatin is formed into capsule components, usually capsule halves, which are brought together to form complete capsules. Just prior to bringing the capsule components together the fluid filling is introduced in measured amounts into the partially formed and as yet unclosed capsules, and the capsule halves are then brought together and sealed to form complete capsules. In such machines according to this invention there may be provided a heated water jacketed holding vat or an electric heater for the vat in which the material that is to be filled into the gelatin capsules formed by the machine is maintained at its best operating temperature which must not, however, substantially exceed the range of 38° to 40° C., otherwise the gelatin is deteriorated and poor or leaky capsules result. The water bath or electrical heater is preferably thermostatically controlled for maintaining a constant temperature at or below 38° to 40° C. in the vat of filling material.

According to my invention a stirrer may be provided right in the filling material vat of the encapsulating machine. Thus, according to my invention, a power mixer may, for example, be mounted so as to have its mixing element immersed in and continuously stir the contents of the supply tank 288 of Patent 1,970,396 or the contents of supply tank 80 of Patent 2,288,327, whereby the filling material or composition that is to be encapsulated is continuously stirred and maintained in a state of temporary fluidity right up to the moment the filling material is pumped in measured amounts for filling the capsules.

As soon as the capsules are formed and filled with the temporarily fluid filling composition or substance, they are preferably chilled. This may be done by allowing them to be delivered out of the machine into cool (18° C.) air but they may be cooled by passing cool air over the filled capsules or by dropping the filled capsules into a bath of cold acetone or other cold liquid which does not dissolve the gelatin. Such added cooling rapidly sets up the filling composition.

After formation, the filled capsules will stand much higher temperatures and such filled capsules of the present invention may be reheated, in many instances, to temperatures well above 38°–40° C. to re-liquefy the filling which can then be re-chilled to recrystallize or solidify the filling. This is a feature of the invention.

One exemplary product of the invention is a capsule of gelatin filled with wax-containing polish which, by virtue of the invention may have a wax content of 20% to 40%, based upon the weight of the filling, and in some instances even higher, as 45% wax content. This is new, for heretofore such high percentages of wax in the filling were impossible to use since such fillings could not be encapsulated. The balance of the composition is principally a non-aqueous solvent for the wax, and to the composition there may be added dye and odorant. Vegetable, insect, mineral and synthetic waxes are used. By blending the waxes, as hereinafter exemplified in greater detail, the development of large crystal size is inhibited. Such filling is entirely compatible with gelatin.

Thus, by way of example, a wax-containing polish gelatin compatible filling for encapsulation in gelatin capsules in accordance with this invention, may have the following composition:

| | Percent |
|---|---|
| Vegetable wax (such as carnauba or candelilla) | 9 to 16 |
| Insect wax (such as beeswax) | 1 to 3 |
| Mineral wax (melting point 130°–140° F.) | 12 to 22 |
| Solvent | 64 to 74 |
| Dye or odorant | Up to 0.5 |

The percentages given are based upon the weight of the filling composition. The vegetable wax component is preferably composed of from 3% to 12% carnauba, the balance being preferably candelilla wax or other vegetable waxes to yield a total vegetable wax component of 9% to 16%, based upon the weight of the polish composition. The filling composition (polish) is formulated by melting the solids and mixing thoroughly, after which the mixture is cooled to a temperature just a little higher than the flow temperature and the solvent is then stirred in to blend the ingredients. The mass may then be cooled and set away until ready to encapsulate.

To encapsulate the gelatin compatible filling composition is subjected to mechanical working, as by using a power driven shaking machine or power-driven stirrer with counter-rotating impeller-cutters. For the stiffer, more resistant filling compositions preliminary heating in a water bath is recommended. As the stirring progresses, the thixotropic filling composition becomes fluid and finally reaches a stage where it can be poured even at temperatures in the range of about 38°–40° C. or lower, and this condition of temporary fluidity will persist for long enough (i. e. one-half hour or so) to allow encapsulation in gelatin capsules by the known (R. P. Scherer type) encapsulating machines.

By way of further illustration of the present invention, but without limitation of its more general aspects, reference is made to the following examples:

*Example I*

| Filling composition ingredients: | Parts by weight |
|---|---|
| Carnauba #1 | 76 |
| Carnauba #3 | 37.5 |
| Paraffin (M. P. 138° F.) | 160 |
| Beeswax | 12.5 |
| Total wax content | 286.0 |
| Turpentine | 710 |
| Nitrobenzene and dye | 4 |
| | 1000.0 |

This gelatin compatible filling composition, in this instance a shoe polish, was made as follows: The solids are melted until fluid and are then mixed. The mixture was cooled to about 100° C. and then turpentine is added and stirred into the mixture. The whole mixture was then cooled, preferably with gentle stirring. The stirring was halted when crystals began to form, and the cooling is continued. The mixture sets up to a rigid consistency, so that it is heavy and solid, like conventional paste shoe polish in a can. It was not as hard as a block of paraffin wax, and could be dented by determined pressure of a finger. This fairly solid mixture did not flow at room temperatures or up to 40° C., and with its flow point temperature of about 50° C. it was not suitable for encapsulation in gelatin capsules by any procedure known prior to the present invention.

However, this shoe polish filling mixture which is ordinarily hard and non-flowable at the upper limits of temperature (i. e. 38°–40° C.) usable in encapsulating in gelatin capsules has thixotropic characteristics such that the polish does become fluid and pourable after rapid stirring. Thus proceeding, five pounds of this filling composition was subjected to high-speed stirring with an adequate powered counter-rotating propeller type of stirrer, similar to a power-driven cake mixer but equipped with a blade similar to that on a Waring Blendor. Stirring was continued for 10 minutes. As the revolving blades bit into the solid polish, they made a characteristic sound. As stirring proceeded, the filling composition (polish) thinned out and it flowed readily. After 10 minutes stirring the mass was removed from the stirrer. The mechanical working occasioned by the stirring raised the temperature slightly but it was still below 40° C. The filling composition had a consistency like heavy cream, and could be poured readily. It was then promptly (within several minutes) dumped into the filling composition supply vat of a Scherer-type encapsulating machine and encapsulated. Encapsulation proceeded easily using gelatin capsules. The capsules were sound and tight and free from leaks. The capsules were allowed to cool as made in cool (18° C.) air and set up firm within a few minutes. A run of 5 pounds of the filling composition made about 360–370 capsules per pound of filling composition, using a fill of about 22.5 minims.

It is optional during the stirring to warm the mixture slightly for the purpose of aiding its softening. This has the advantage of easing the load on the stirrer, particularly at the outset. A temperature higher than 38°–40° C. may be used for this warming, and can be achieved conveniently by using a water bath to warm the vessel in which the stirring of the filling composition is accomplished. If thus warmed to temperatures above 38°–40° C., the filling composition is allowed to cool to about 38°–40° C. or slightly lower before encapsulation, as previously pointed out, to avoid destruction of the gelatin capsules or at least unsatisfactory encapsulation. The stirring may be continued as the temperature thus cools to 38°–40° C. and the flowability thus maintained by mechanical working (stirring) right up to the time the filling composition is placed in the vat of the machine for encapsulation. In another run the filling composition was stirred while in the supply vat of the filling machine and thus made even more fluid or continued fluid temporarily while encapsulation was in process.

As the material is mechanically worked (stirred) and thus made temporarily fluid, it may be pumped directly to the encapsulating machine, thus enabling a continuous process to be achieved where desired. If desired, a stirrer can be built into the holding vat of the encapsulating machine as previously stated so as to permit stirring to be continued (and the thixotropic temporary flowability of the filling composition thus maintained) right up to the time the material in the vat of the encapsulating machine is fed in to the capsules. This is desirable and makes for uniformity and excellence of product.

The final capsules were capable of being deformed and ruptured with pressure applied by the fingers and the pasty (stiff, non-flowable) filling composition inside the capsules could then be pressed out of the ruptured capsule for use. The capsules were used in single use polishing assemblies of my application Serial No. 315,804, filed October 20, 1952, and gave a lasting shine of high gloss on shoes.

*Example II*

| Filling composition ingredients: | Parts by weight |
|---|---|
| Carnauba #3 | 50 |
| Candelilla | 85 |
| Paraffin wax (M. P. 130° F.) | 200 |
| Beeswax | 15 |
| Total wax content | 350 |
| Turpentine | 646 |
| Trichlorobenzene and dye | 4 |
| | 1000 |

This gelatin compatible filling composition was prepared according to the procedure of Example I. Flow point was about 50° C. After being compounded, it was stiff and hard at 40° C. The filling composition was then stirred (mechanically worked) and, due to its thixotropic character, became temporarily pourable and flowable at 38°–40° C. and was then encapsulated in gelatin capsules without difficulty in an R. P. Scherer-type encapsulating machine. 365 capsules were produced per pound of filling composition (polish). After encapsulating the capsules were allowed to cool by standing in air (about 18° C.) and the filling within the capsules set up into a mass as relatively firm mass the same as when originally prepared. The capsules could be ruptured without under finger pressure and the filling, i. e. the stiff pasty non-flowable polishing composition could easily be squeezed out for use.

This polish composition gives an exceedingly fine polish because of its high wax content and produces a very hard gloss which would be renewed by rebuffing. In this composition, candelilla wax was substituted for the more expensive carnabua #1 wax. Carnauba #1 wax is hard and crystalline. Carnauba #3 is a very hard, solid wax. Carnauba #1 is less desirable than carnauba #3 for a shoe polish. The use of some carnauba wax is desirable, since it imparts easy and quick shine-producing qualities and forms a smooth, hard gloss film of high light-reflective power.

In this formulation, trichlorobenzene has been substituted as an odorant for nitrobenzene. Although the odor of nitrobenzene (oil of mirbane) has traditionally been associated with shoe polishes, the compound is to some degree toxic and its use is decreasing. A similar odor may be obtained by substituting for the nitrobenzene an equal amount by weight of trichlorobenzene or orthodichlorobenzene.

*Example III*

| Filling composition ingredients: | Parts by weight |
|---|---|
| Carnauba #3 | 37.5 |
| Candelilla | 76 |
| Paraffin (M. P. 138° F.) | 160 |
| Beeswax | 12.5 |
| Total wax content | 286.0 |
| Turpentine | 604 |
| Carbon tetrachloride | 106 |
| Nitrobenzene and dye | 4 |
| | 1000 |

This gelatin compatible filling composition is a shoe polish in which carbon tetrachloride has been substituted for turpentine in an amount equal to about 15% of the total turpentine content. The use of carbon tetrachloride increases the flash point and reduces fire hazard. It may be used to replace up to 100% of the turpentine, but if a percentage much higher than 15% of the turpentine is used, there is a tendency to remove some of the dye from the shoe to which the polish is applied. The optimum amount appears to be in the neighborhood of 15% of the weight of the turpentine. The use of carbon tetrachloride also makes the polish dry more quickly on the shoe, and its use is also desirable for this reason, as well as for the purpose of reducing the fire hazard.

The compounding and preparation of the filling composition proceeded as in Example I and after being prepared and cooled to below 40° C., the polish composition was stiff and nonflowable. It is thixotropic but could be made temporarily fluid and flowable by stirring as in Example I and as thus rendered temporarily fluid could be filled into gelatin capsules all as in Example I. In the capsules (which could be ruptured by firm finger pressure) the filling composition (polish) was hard, pasty and nonflowable, but could be squeezed out of the capsules with pressure. The finished manufactured units (filled capsules) were used in shoe polishing assemblies of the type shown in my copending application above identified and the polish squeezed out of the capsules by finger pressure gave a hard gloss shine of high brilliance.

Other filling compositions are:

*Example IV*

| Filling composition ingredients: | Parts by weight |
|---|---|
| Carnauba #3 | 50 |
| Candelilla | 85 |
| Paraffin | 200 |
| Beeswax | 50 |
| Total wax content | 350 |
| Turpentine | 550 |
| Carbon tetrachloride | 96 |
| Nitrobenzene and dye | 4 |
| | 1000 |

This gelatin compatible filling is another hard polish in which carbon tetrachloride has been substituted for 15% of the turpentine.

*Example V*

| Filling composition ingredients: | Parts by weight |
|---|---|
| Carnauba #3 | 40 |
| Candelilla | 50 |
| Beeswax | 10 |
| Paraffin (M. P. 130° F.) | 120 |
| Total wax content | 220 |
| Gum turpentine | 590 |
| Carbon tetrachloride | 140 |
| Trichlorbenzene | 4 |
| | 954 |

This gelatin compatible filling formulation produces an excellent neutral polish suitable for furniture polish. The finished units (filled capsules) were used for single use polishing kits. Thus, such a filled capsule assembled in a single use packet of the type shown in my copending application was used for polishing uses such as polishing a decorative woodwork. Other uses are polishing golf clubs (sporting goods); leather goods.

*Example VI*

| Filling composition ingredients: | Parts by weight |
|---|---|
| Carnauba #3 | 75 |
| Beeswax | 30 |
| Candelilla | 80 |
| Paraffin (M. P. 130° F.) | 120 |
| Total wax content | 305 |
| Gum turpentine | 580 |
| Carbon tetrachloride | 120 |
| Nitrobenzene and dye | 5 |
| | 1010 |

This composition is useful as a shoe polish.

*Example VII*

| Filling composition ingredients: | Parts by weight |
|---|---|
| Carnauba #3 | 66 |
| Candelilla | 80 |
| Beeswax | 10 |
| Paraffin (M. P. 130° F.) | 130 |
| Total wax content | 286 |
| Gum turpentine | 580 |
| Carbon tetrachloride | 130 |
| Nitrobenzene | 4 |
| | 1000 |

In each of the above formulations, the procedure set forth in Example I was followed to produce the normally stiff, pasty filling composition in bulk ready for encapsulation. The filling composition was then in each instance rendered temporarily flowable by mechanical working (stirring) and while thus flowable, was encapsulated as described in Examples I and II.

It will be noted that these aforesaid filling compositions are wax containing polishes in which there are a combination of vegetable, insect and mineral waxes. Synthetic waxes are also useful. The total wax content and to some extent the type wax, their melting points and mutual interaction have an effect upon the final characteristics of the polish. The percentage of wax, based upon the weight of the total filling composition must be considered. If too high a wax content is used, the polish becomes difficult to maintain flowable at or below the temperature (38°-40° C.) required for encapsulation. On the other hand, a lower limit of about 15% total wax content is necessary to produce a good polishing composition. When less than this amount of wax is used, the composition is so diluted by solvents that it does not produce a good or lasting shine. However, if one is willing to put up with less excellent results, less wax can be used. An upper limit of about 45% total wax content is the practical ceiling for obtaining the desirable properties, while still maintaining the composition sufficiently thixotropic in character so as to be capable of being made flowable upon shaking or stirring. A practical range of total wax content is therefore 15% to 45%, with the preferred range 20% to 40%.

Exemplary gelatin compatible filling composition blends include vegetable, insect, synthetic and mineral waxes, and when coupled with the procedure used, provide filling compositions which are thixotropic and yet do excessively crystallize upon cooling. In the temporarily fluid semi-amorphous (thixotropic) condition, the compositions readily pass through the tubes, valves, pumps and nozzles of the capsulation machine. When the filling composition is encapsulated, it loses its temporary fluidity and hardens within its capsules so that after the capsules are ruptured (by finger pressure or dissolving) by the user, the filling composition can be readily spread over the surface being treated or otherwise used.

Any desired colors may be incorporated into the above filling composition when formulated as polishes. For ease of formulation, the dyes should be soluble in one of the liquid ingredients, and should be added to the mixture in solution.

For polish filling compositions the particular waxes used are not critical. For instance, the optimum total percentage of the vegetable and insect waxes appears to be about 15.6%. For shoe polish the total percentage should for best results include 1% to 3% of an insect wax but this may be omitted in polishes used for other purposes. The insect wax (such as the beeswax) used in the examples, gives the desirable "tacky" feeling to the polish, and is an inexpensive ingredient. Similar insect waxes, such as Chinese insect wax, may be substituted for the beeswax. The vegetable wax, which is the basis for most furniture polishes and general purpose polishes (woodwork, leather goods, etc.) should include carnauba #3 for the hard gloss it produces. This wax is also used in the exemplary shoe polishes hereof. The range of carnauba #3 may be 4% to 7.5% of the final composition of thereabouts. Although it would be desirable in some respects to use carnauba (#1 and #3) to make up all of the vegetable wax in the polish, this wax is usually considered too expensive to be competitive. As a result candelilla wax has been used in some of the examples hereof as a desirable lower cost substitute for part of the carnauba waxes. Other substitutes are ouricuri wax and some of the recently-developed synthetic waxes. The substitution of another wax for some of the carnauba wax, also has the advantage of restricting the formation of large crystals in the polish. In this function, the substituent wax is aided by the beeswax. These waxes substituted for carnauba, and the beeswax, are also valuable preservatives for leather. In addition, they exert a plasticizing effect on the carnauba wax, and the final compositions are such as to produce a hard gloss that may be rebuffed several times between applications of the polish.

The paraffin wax used in all formulations, in the range of 12% to 22%, may be considered as a special constituent carefully selected for its desirable properties. Paraffin waxes with melting points in the range of 130°–140° F. are suitable. The paraffin wax imparts high water resistance to the surface and prevents formation of powdery residues in cracks or decorative indentations of the surface to which the composition is applied. The powdery residue is often associated with polishes composed largely of carnauba #1 or in which vegetable waxes other than carnauba have not been used. Care must be taken in the proportion of paraffin wax that is used, however, since an excess will interfere with the gloss-producing properties of the other waxes.

Turpentine is used as the solvent because of its high solvent power for the waxes, but petroleum solvents may be substituted. Turpentine is considered preferable to petroleum solvents not only because of its better solubilizing properties, but also because it seems to prevent excessive penetration of the polish into the surface especially where the surface is leather. It is also a good solvent for most dyes that may be desired to be added. As previously pointed out, carbon tetrachloride may be substituted for 15% or more by weight of the turpentine content to reduce fire hazard and to hasten drying of the polish on the surface to which it is applied. Other conventional substitutes for turpentine may be used where a cheaper filling composition is essential. Total solvent content of the polish should be in the range of 64% to 74% by weight of the polish.

When the composition has been worked mechanically and is rendered temporarily fluid (flowable) it is ready for capsulation. The use of a warm water bath around the container for the temporarily fluidized composition will retard setting up of the polish. The Scherer machines now generally in use for encapsulation have a built-in water bath (or electric heater) for this purpose. As previously stated herein, there may be built into such machines a stirrer positioned so as to keep the material in the filling material vat of the machine in a constant state of agitation as it is held by the machine ready to be fed out for capsulation. The stirrer is stuck down into the material vat and driven by an external motor. This is a part of this invention. The stirring so produced and the gentle heat of the water bath or electric heater or both have the effect of retarding setting up of the composition. Either heat or stirring or both may be used to retard set-up. Thixotropic compositions that are ordinarily hard and stiff at maximum encapsulating temperatures may thus be maintained fluid at such temperatures (about 38°–40° C.) right up to the moment the composition is pumped out in measured amounts into the capsules, and the gelatin of the capsules is in no way deteriorated. Good, merchantable capsules result. In many instances it is possible to encapsulate when the filling composition temperature is well below 38°–40° C., this being true where the filling composition has thixotropic properties.

According to this invention the filling compositions within the gelatin capsules are of low water content, 5% or less, preferably 1% or less water content. So constituted, the gelatin capsule retains its strength as required. The gelatin is preferably plasticized so as to be somewhat pliant at room temperature (18° C.).

When the moisture content of the composition is less than about 5% the composition is regarded as being substantially free from moisture within the purview of the invention.

By the term "mechanically worked" as used herein and in the claims, there is included shaking, stirring or mixing as hereinbefore described for rendering temporarily fluid the thixotropic normally solid or semi-solid filling.

As many apparently widely different embodiments of this invention may be made without departing from the spirit and scope thereof, it is to be understood that I do not limit myself to the specific embodiments herein.

What I claim is:

1. The improved process which comprises mechanically working a gelatin compatible polish composition which is normally solid when at rest at temperatures above the melting point of gelatin but fluid and pourable when mechanically worked, said mechanical working being carried out at a temperature below the melting point of gelatin continued until said polish composition is fluid and pourable, and encapsulating the polish composition in gelatin while it is in a fluid and pourable state.

2. The method of packaging thixotropic wax-solvent gelatin compatible polish compositions which comprises mechanically working a thixotropic polish composition until it is fluid and pourable, and packaging the composition in gelatin capsules while the polish composition is in a fluid and pourable state and has a temperature not substantially exceeding 38° to 40° C.

3. The method comprising mechanically working a thixotropic gelatin compatible composition until it becomes temporarily fluid at a temperature not substantially exceeding 38° to 40° C. and while the composition is temporarily fluid forming gelatin capsule components and introducing the temporarily fluid composition into said capsule components and while so doing closing said components on each other to form complete filled capsules.

4. The method comprising mechanically working a thixotropic gelatin compatible composition until it becomes temporarily fluid at a temperature not substantially exceeding 38° to 40° C. and while the composition is temporarily fluid forming gelatin capsule components, introducing the temporarily fluid composition into said capsule components and while so doing closing said components on each other to form complete filled capsules, and promptly cooling said formed and filled capsules.

5. The method comprising mechanically working a thixotropic gelatin compatible composition until it becomes temporarily fluid at a temperature not substantially exceeding 38° to 40° C., and while the composition is temporarily fluid forming gelatin capsule components, introducing the temporarily fluid composition into said capsule components and while so doing closing said components on each other to form complete filled capsules, and promptly cooling said formed and filled capsules in a cold fluid which does not dissolve gelatin.

6. The method comprising mechanically working a thixotropic gelatin compatible composition until it becomes temporarily fluid at a temperature not substantially exceeding 38° to 40° C., and while the composition is temporarily fluid forming gelatin capsule components, introducing the temporarily fluid composition into said capsule components and while so doing closing said components on each other to form complete filled capsules, cooling said capsules, then reheating said capsules in warm air and then promptly chilling said filled capsules in a cold fluid which does not dissolve gelatin.

7. The method comprising mechanically working a substantially moisture free thixotropic gelatin compatible polish composition containing 15% to 45% wax, a solvent therefor, until it is rendered temporarily fluid at a temperature not substantially exceeding 38° to 40° C., and while the polish composition is temporarily fluid forming gelatin capsule components and introducing the temporarily fluid composition into said capsule components and while so doing closing said components on each other to form complete filled capsules.

8. The method comprising mechanically working a substantially moisture free gelatin compatible thixotropic polish composition comprising

|  | Percent |
|---|---|
| Vegetable wax | 9 to 16 |
| Insect wax | 1 to 3 |
| Mineral wax | 12 to 22 |
| Solvent for said waxes | 64 to 74 | until said polish composition is rendered temporarily fluid at a temperature not substantially exceeding 38° to 40° C., and while the polish composition is temporarily fluid forming gelatin capsule components and introducing the temporarily fluid composition into said capsule components and while so doing closing said components on each other to form complete filled capsules.

References Cited in the file of this patent

UNITED STATES PATENTS

| 1,628,333 | Schaub | May 10, 1927 |
| 1,716,488 | Doering | June 11, 1929 |
| 1,873,716 | Nickerson | Aug. 23, 1932 |
| 1,945,255 | Camagin | Jan. 30, 1934 |
| 2,091,993 | Jones | Sept. 7, 1937 |
| 2,228,492 | Wetherbee | Jan. 14, 1941 |
| 2,323,581 | Weckesser | July 6, 1943 |
| 2,528,506 | Foye | Nov. 7, 1950 |
| 2,613,488 | Attride | Oct. 14, 1952 |
| 2,638,179 | Yard | May 12, 1953 |

OTHER REFERENCES

Bennett: "Commercial Waxes," pp. 490, 497, 524 (1944), The Chemical Publishing Co., New York, N. Y.

Warth: "The Chemistry and Technology of Waxes" (1947), pp. 465–66 (pub. by Reinhold). (Copy in Div. 56.)